(12) United States Patent
Yokoi et al.

(10) Patent No.: US 10,141,578 B2
(45) Date of Patent: *Nov. 27, 2018

(54) METHOD FOR PRODUCING FUEL CELL MEMBRANE ELECTRODE ASSEMBLY

(71) Applicant: HONDA MOTOR CO., LTD., Tokyo (JP)

(72) Inventors: Mai Yokoi, Tochigi (JP); Kazuhide Matsuo, Tochigi (JP); Shunsuke Konishi, Tochigi (JP); Yuichi Hori, Tochigi (JP); Nobuyoshi Muromoto, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,720

(22) Filed: Mar. 16, 2017

(65) Prior Publication Data

US 2017/0271685 A1    Sep. 21, 2017

(30) Foreign Application Priority Data

Mar. 18, 2016    (JP) .................................. 2016-055712

(51) Int. Cl.
*H01M 4/88*    (2006.01)
*B32B 37/14*    (2006.01)
(Continued)

(52) U.S. Cl.
CPC .......... *H01M 4/8825* (2013.01); *B32B 37/14* (2013.01); *B32B 38/10* (2013.01); *H01M 4/881* (2013.01);
(Continued)

(58) Field of Classification Search
CPC ..... B32B 2457/18; B32B 37/14; B32B 38/10; H01M 2008/1095; H01M 4/881; H01M 4/8825; H01M 4/8875
(Continued)

(56) References Cited

U.S. PATENT DOCUMENTS 5,752,988 A    5/1998   Okamoto et al.
5,761,793 A *  6/1998   Bevers ................ H01M 8/1004
                                              29/623.3
(Continued)

FOREIGN PATENT DOCUMENTS

JP    3273591        2/2002
JP    2008-258142 A  10/2008
(Continued)

OTHER PUBLICATIONS

Search Report for JP2016-055713.*
(Continued)

*Primary Examiner* — Sonya M Sengupta
(74) *Attorney, Agent, or Firm* — Hankin, Hill & Clark LLP (57) ABSTRACT

A method for producing a fuel cell membrane electrode assembly includes: a step of bonding a polymer electrolyte membrane and a first catalyst layer-including substrate; a step of making a cut by way of a laser beam so that the first catalyst layer-including substrate bonded with the polymer electrolyte membrane becomes a predetermined shape; a step of peeling an unwanted portion of the first catalyst layer-including substrate from the polymer electrolyte membrane; and a step of forming a second catalyst layer on the other face of the polymer electrolyte membrane, and punching out the polymer electrolyte membrane and second catalyst layer so that the first catalyst layer-including substrate of the predetermined shape bonded on one face is surrounded, (Continued)

in which the laser beam has a wavelength that penetrates the polymer electrolyte membrane without penetrating the first catalyst layer-including substrate.

4 Claims, 4 Drawing Sheets

(51) Int. Cl.
    *B32B 38/10*     (2006.01)
    *H01M 8/1018*     (2016.01)

(52) U.S. Cl.
    CPC ....... *H01M 4/8875* (2013.01); *B32B 2457/18* (2013.01); *H01M 2008/1095* (2013.01)

(58) Field of Classification Search
    USPC ...................................... 156/267, 268, 272.8
    See application file for complete search history.

(56) References Cited

U.S. PATENT DOCUMENTS

| | | |
|---|---|---|
| 7,754,365 B2 | 7/2010 | Fukushima et al. |
| 2008/0220307 A1 | 9/2008 | Fukushima et al. |

FOREIGN PATENT DOCUMENTS

| | | |
|---|---|---|
| JP | 2010-119967 | 6/2010 |
| JP | 5611604 | 9/2014 |

OTHER PUBLICATIONS

Office Action for JP2016-055713.*
U.S. Office Action dated Feb. 9, 2018, from U.S. Appl. No. 15/460,742, 11 pages.
Japanese Search Report (English Translation), JP 2016-0055713, drafted Aug. 1, 2017, 7 pages.
Japanese Decision to Grant a Patent (English Translation), JP 2016-0055713, drafted Aug. 21, 2017, 3 pages.

* cited by examiner

METHOD FOR PRODUCING FUEL CELL MEMBRANE ELECTRODE ASSEMBLY

This application is based on and claims the benefit of priority from Japanese Patent Application No. 2016-055712, filed on 18 Mar. 2016, the content of which is incorporated herein by reference.

BACKGROUND OF THE INVENTION

Field of the Invention

The present invention relates to a method for producing a fuel cell membrane electrode assembly in which electrode layers are laminated on both surfaces of an electrolyte membrane.

Related Art

The membrane electrode assembly (MEA) of a fuel cell has a structure made by a catalyst layer and diffusion layer (collectively "electrode layer") being laminated on both surfaces to sandwich an electrolyte membrane, as described in Patent Document 1, for example. In addition, one electrode layer, in order to assume a creepage distance for ensuring insulation between the electrode layers on both surfaces, is configured so that the electrolyte membrane is exposed at the peripheral edge.

As a method of producing such an MEA, there is a method of forming a catalyst layer on a diffusion layer substrate, and then bonding this to the electrolyte membrane, as described in Patent Document 2.

On the other hand, in order to raise the production efficiency of MEAs, it has been proposed to continuously produce the MEA in a roll-to-roll method as shown in Patent Document 3.

Patent Document 1: Japanese Patent No. 5611604
Patent Document 2: Japanese Patent No. 3273591
Patent Document 3: Japanese Unexamined Patent Application, Publication No. 2010-119967

SUMMARY OF THE INVENTION

However, when trying to produce MEAs by bonding the catalyst layer-including diffusion layer described in Patent Document 2 to the electrolyte membrane by way of a roll-to-roll method, the following such sequence is considered. First, the lamination/bonding of the catalyst layer-including diffusion layer unrolled from a catalyst layer-including diffusion layer roll is performed on one side or both sides of the electrolyte membrane unrolled from the electrolyte membrane roll. Then, an excess portion of the catalyst layer-including diffusion layer is peeled from the membrane layer, and the electrolyte layer and catalyst layer-including diffusion layer is further cut into a predetermined shape to complete the MEA.

It has been considered to irradiate a laser for cutting of such a catalyst layer-including diffusion layer. However, if the absorbance of this laser to the electrolyte membrane is high, it will cause damage to the electrolyte membrane. Furthermore, in the case of a catalyst layer being formed on the other face of the electrolyte membrane, the catalyst layer on the other face will also be removed upon irradiating the laser.

The present invention has an object of providing a method for producing a fuel cell membrane electrode assembly that can prevent a required catalyst layer from being removed, while suppressing damage to the electrolyte membrane.

In order to achieve the above-mentioned objects, the present invention provides method for producing a fuel cell membrane electrode assembly including: a step of preparing an electrolyte membrane (e.g., the polymer electrolyte membrane PEM described later) (for example, Step 1 described later); a step of preparing a catalyst layer-including substrate (for example, the first catalyst layer-including substrate GDE1 described later) in which a first catalyst layer (for example, the first catalyst layer 111 described later) is formed on one face of a sheet-like substrate (for example, Step 2 described later); a step of laminating the catalyst layer-including substrate so that the first catalyst layer opposes one face of the electrolyte membrane (for example, Step 3 described later); a step of bonding the electrolyte membrane and the catalyst layer-including substrate (for example, Step 4 described later); a step of making a cut (for example, the cut CL described later) by way of energy rays (for example, the laser beam LB described later) so that the catalyst layer-including substrate bonded with the electrolyte membrane becomes a predetermined shape (for example, Step 5 described later); a step of peeling an unwanted portion (for example, the unwanted portion GDE12 described later) of the catalyst layer-including substrate other than the predetermined shape portion (for example, the portion of predetermined shape GDE11 described later) from the electrolyte membrane (for example, Step 6 described later); and a step of forming a second catalyst layer (for example, the second catalyst layer 121 described later) on one other face of the electrolyte membrane, and punching out the electrolyte membrane and the second catalyst layer so that the catalyst layer-including substrate of the predetermined shape bonded to the one face is surrounded (for example, Step 7 described later), in which the energy rays penetrate the electrolyte membrane without penetrating the catalyst layer-including substrate.

In the present invention, first, after bonding the catalyst layer-including substrate only to one face of the electrolyte membrane, the unwanted portion is removed by cutting using energy rays such as a laser beam that penetrates the electrolyte membrane without penetrating the catalyst layer-including substrate and peeling, and subsequently the catalyst layer is formed on the other face. Since the catalyst layer is formed on the other face after cutting in a predetermined shape and removing in this way, this catalyst layer will not be removed by the energy rays penetrating the electrolyte membrane. Therefore, according to the present invention, it is possible to prevent the required catalyst layer from being removed while suppressing damage to the electrolyte film.

In addition, in order to achieve the above-mentioned objects, the present invention provides method for producing a fuel cell membrane electrode assembly including: a step of preparing an electrolyte membrane (e.g., the polymer electrolyte membrane PEM described later) (for example, Step 1 described later); a step of preparing a catalyst layer-including substrate (for example, the first catalyst layer-including substrate GDE1 described later) in which a first catalyst layer (for example, the first catalyst layer 111 described later) is formed on one face of a sheet-like substrate (for example, Step 2 described later); a step of laminating the catalyst layer-including substrate so that the first catalyst layer opposes one face of the electrolyte membrane (for example, Step 3 described later); a step of bonding the electrolyte membrane and the catalyst layer-including substrate (for example, Step 4 described later); a step of removing, so that the catalyst layer-including substrate bonded with the electrolyte membrane becomes a predetermined shape, an unwanted portion (for example, the unwanted portion GDE12 described later) other than a portion of the predetermined shape (for example, the portion GDE11 of predetermined shape described later) by way of energy rays (for example, the laser beam LB described later) (for example, Step 15 described later); and a step of forming a second catalyst layer (for example, the second catalyst layer 121 described later) on one other face of the electrolyte membrane, and punching out the electrolyte membrane and the second catalyst layer so that the catalyst layer-including substrate of the predetermined shape bonded to the one face is surrounded (for example, Step 7 described later), in which the energy rays penetrate the electrolyte membrane without penetrating the catalyst layer-including substrate.

In the present invention, first, after bonding the catalyst layer-including substrate only to one face of the electrolyte membrane, the unwanted portion is directly removed using energy rays such as a laser beam that penetrates the electrolyte membrane without penetrating the catalyst layer-including substrate, and subsequently forms the catalyst layer on the other face. Since the catalyst layer is formed on the other face after removing in a predetermined shape in this way, this catalyst layer will not be removed by the energy rays penetrating the electrolyte membrane. Therefore, according to the present invention, it is possible to prevent the required catalyst layer from being removed while suppressing damage to the electrolyte film.

In each of the aforementioned inventions, the energy rays preferably have transmittance relative to the electrolyte membrane of at least 80%.

The present invention uses a laser beam having transmittance relative to the electrolyte membrane of at least 80%. It is thereby possible to more reliably suppress damage to the electrolyte membrane by using high-transmittance energy rays.

According to the present invention, it is possible to provide a method for producing a fuel cell membrane electrode assembly that can prevent a required catalyst layer from being removed, while suppressing damage to the electrolyte membrane.

DETAILED DESCRIPTION OF THE INVENTION

Embodiments of the present invention will be explained in detail while referencing the drawings. It should be noted that, in the explanation of a second embodiment, the same reference symbols will be assigned for configurations, functions and effects shared with the first embodiment, and explanations thereof will be omitted as appropriate.

(First Embodiment)

Figure 1:
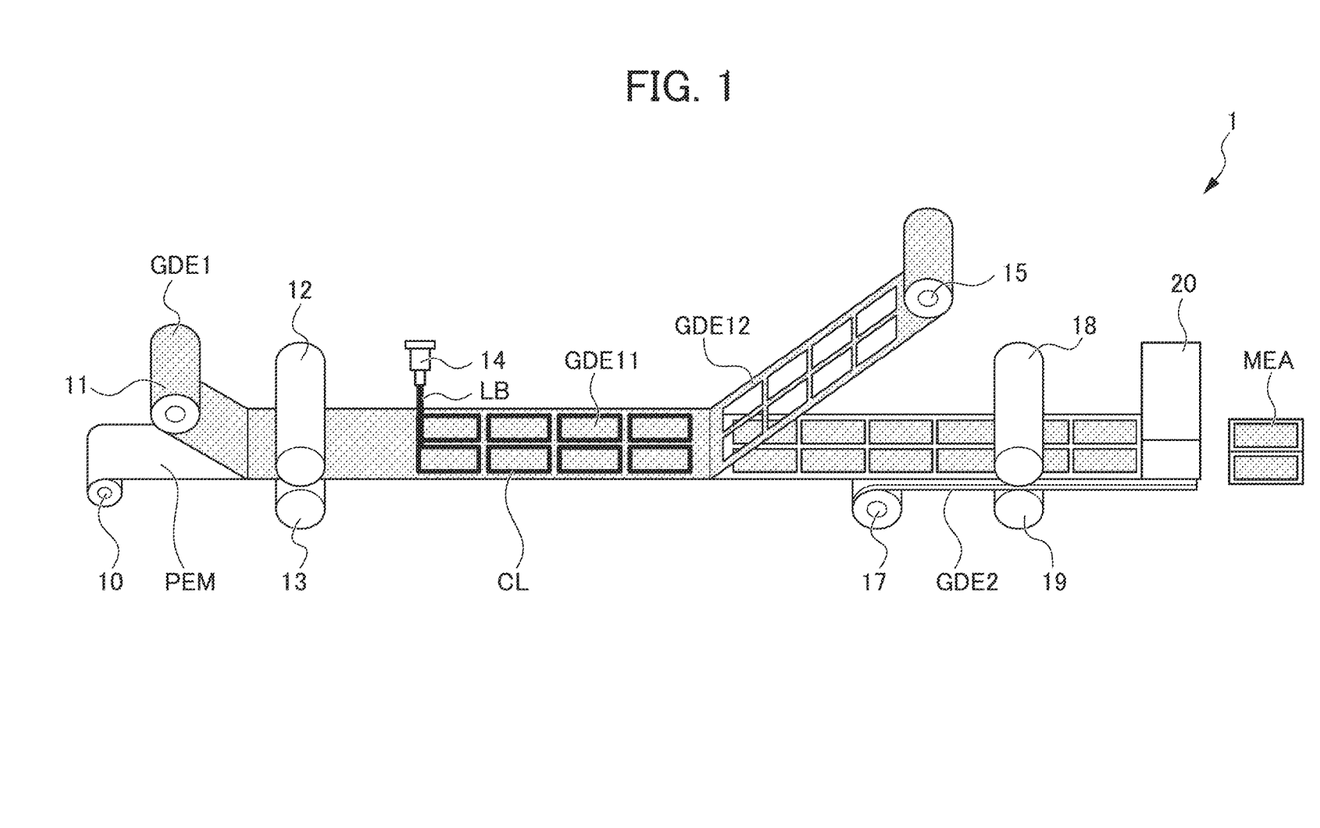
FIG. 1 is a schematic view showing a production line 1 for a fuel cell membrane electrode assembly MEA according to a first embodiment of the present invention.
Figure 2:
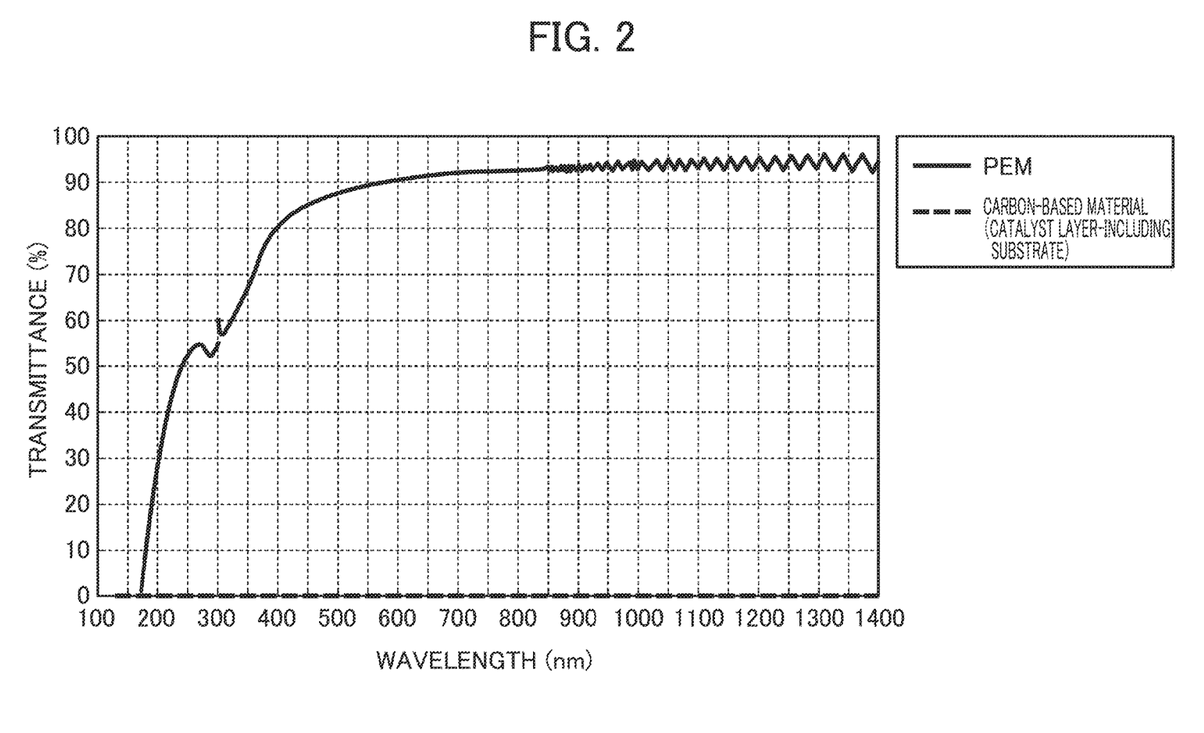
FIG. 2 is a graph showing the relationship between wavelength and transmittance of a laser beam LB of a laser device 14.

FIG. 1 is a schematic view showing a production line 1 of a membrane electrode assembly MEA for a fuel cell according to the embodiment of the present invention. FIG. 2 is a graph showing a relationship between wavelength and transmittance of a laser beam LB of a second laser device 14.

Figure 3:
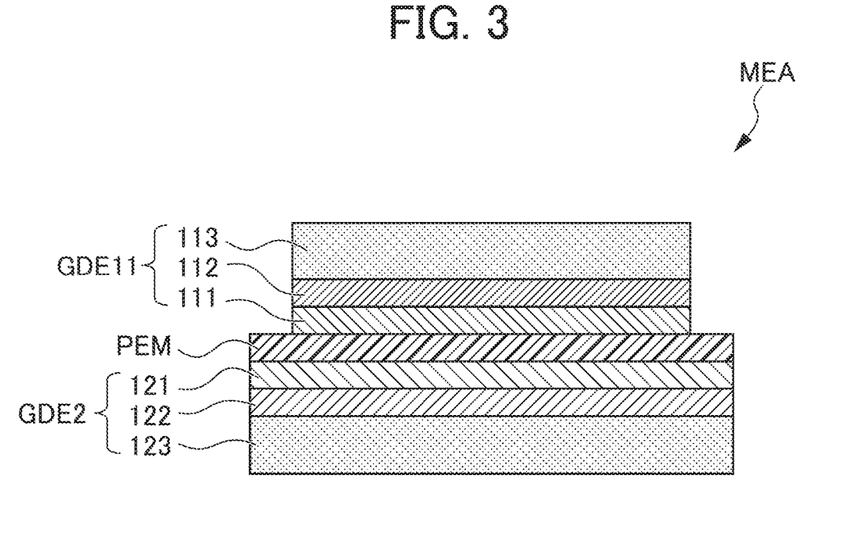
FIG. 3 is a cross-sectional view of a fuel cell membrane electrode assembly MEA produced.

FIG. 3 is a cross-sectional view of a fuel cell membrane electrode assembly MEA produced.

The production line 1 of the fuel cell membrane electrode assembly (Membrane Electrode Assembly) MEA shown in FIG. 1 raises the production efficiency of the fuel cell membrane electrode assembly MEA by making continuous with a roll-to-roll method. More specifically, the production line 1 of the fuel cell membrane electrode assembly MEA includes: an electrolyte membrane roll 10; a first substrate roll 11; a pair of upper/lower temporary bonding rolls 12, 13; a laser device 14; a recovery roll 15; a second substrate roll 17; a pair of upper/lower bonding rolls 18, 19; a cutter 20; etc.

The electrolyte membrane roll 10 is a roll that prepares a continuous sheet-like (belt-like) polymer electrolyte membrane PEM, and rotates around a horizontal shaft at the upstream of the production line 1. This electrolyte membrane roll 10 draws the polymer electrolyte membrane PEM to downstream by rotating. The polymer electrolyte membrane PEM that is drawn to travel downstream from the electrolyte membrane roll 10 is laminated so that a first catalyst layer 111 (refer to FIG. 3), in which a lower face that is one face of the first catalyst layer-including substrate GDE1 that is drawn to travel downstream from the first substrate roll 11 is formed on the lower face of the first catalyst layer including substrate GDE1, opposes a top face which is one face of the polymer electrolyte membrane PEM.

The first substrate roll 11 is a roll that prepares a continuous sheet-like (belt-like) first catalyst layer-including substrate (Gas Diffusion Electrode) GDE1, and rotates around a horizontal shaft at the upstream of the production line 1. This first substrate roll 11 draws the first catalyst layer-including substrate GDE1 from above the electrolyte membrane roll 10 to downstream by rotating. In the first catalyst layer-including substrate GDE1 that is drawn to travel downstream from the first substrate roll 11, the first catalyst layer 11 (refer to FIG. 3) is formed on the lower face, which is one side thereof. In addition, regarding the first catalyst layer-including substrate GDE1 that is drawn out to travel downstream from the first substrate roll 11, the first catalyst layer 111 which is at the bottom face that is one face thereof is laminated so as to oppose the top face which is one face of the polymer electrolyte membrane PEM that is drawn out to travel downstream from the electrolyte membrane roll 10.

The pair of upper/lower temporary bonding rolls 12, 13 is provided so that each is rotatable around a horizontal shaft, and the circumferences substantially contact each other at the downstream of the electrolyte membrane roll 10 and first substrate roll 11. This pair of upper/lower temporary bonding rolls 12, 13 is configured to be heatable and, by causing the polymer electrolyte membrane PEM and the first catalyst layer-including substrate GDE1 laminated vertically to pass therethrough, applies a vertical external force and heat to this polymer electrolyte membrane PEM and first catalyst layer-including substrate GDE1 while rotating, and bonds this polymer electrolyte membrane PEM and first catalyst layer-including substrate GDE1.

The laser device 14 is provided downstream of the pair of upper/lower temporary bonding rolls 12, 13, so as to be movable in a horizontal direction above the first catalyst layer-including substrate GDE1 bonding to the top face of the polymer electrolyte membrane PEM by passing through this pair of upper/lower temporary bonding rolls 12, 13, and irradiates a laser beam LB towards the first catalyst layer-including substrate GDE1. This laser device 14, by irradiating the laser beam LB towards the first catalyst layer-including substrate GDE1 while moving in the horizontal direction, makes cuts CL so that the first catalyst layer-including substrate GDE1 bonding with the polymer electrolyte membrane PEM becomes a predetermined shape (for example, rectangle).

The laser beam LB of the laser device 14 is a wavelength that penetrates the polymer electrolyte membrane PEM without penetrating the first catalyst layer-including substrate GDE1. The laser beam LB of this laser device 14 preferably has transmittance relative to the polymer electrolyte membrane PEM of at least 80%, and more preferably at least 90%. In other words, as shown in FIG. 2, the wavelength of the laser beam LB of the laser device 14 is preferably at least 400 nm, and more preferably at least 600 nm. More specifically, it is possible to use a YAG laser (wavelength 1064 nm).

In addition, as is evident from FIG. 2, the laser beam LB of the laser device 14 has transmittance relative to carbon-based material of about 0% irrespective of the wavelength. As described later, since the catalyst layer-including substrate is configured by carbon-based material, the laser beam LB of the laser device 14 will be absorbed without penetrating the first catalyst layer-including substrate GDE1. Cutting or removal relative to the first catalyst layer-including substrate GDE1 thereby becomes possible by the laser beam LB of the laser device 14.

The recovery roll 15 is a roll that recovers an unwanted portion GDE12 of the first catalyst layer-including substrate GDE1, and rotates around a horizontal shaft above the first catalyst layer-including substrate GDE1 downstream of the laser device 14. This recovery roll 15 peels, from the polymer electrolyte membrane PEM, the unwanted portion GDE12 other than the portion GDE 11 of a predetermined shape (for example, rectangle) of the first catalyst layer-including substrate GDE1 in which the cuts CL were made by the laser beam LB of the laser device 14, to recover this unwanted portion GDE 12 while winding up by rotating.

For the polymer electrolyte membrane PEM from which the unwanted portion GDE12 of the first catalyst layer-including substrate GDE1 was peeled off by the recovery roll 15, opposing a lower face which is one face thereof, is a second catalyst layer 121 (refer to FIG. 3), in which a top face that is one face of the second catalyst layer-including substrate GDE2 that is drawn to travel downstream from the second substrate roll 17 is formed on the top face of the second catalyst layer including substrate GDE2.

The second substrate roll 17 is a roll that prepares the continuous sheet-like (belt-like) second catalyst layer-including substrate (Gas Diffusion Electrode) GDE2, and rotates around a horizontal shaft below the polymer electrolyte membrane PEM downstream of the laser device 14. By rotating, this second substrate roll 17 draws out to downstream the second catalyst layer-including substrate GDE2 from below the polymer electrolyte membrane PEM, which is traveling. In the second catalyst layer-including substrate GDE2 that is drawn out to travel downstream from the second substrate roll 17, the second catalyst layer 121 (refer to FIG. 3) is formed on the top face which is one side thereof. In addition, regarding the second catalyst layer-including substrate GDE2 that is drawn out to travel downstream from the second substrate roll 17, the second catalyst layer 121 which is at the top face that is one face thereof is laminated so as to oppose the bottom face which is the other face of the polymer electrolyte membrane PEM from which the unwanted portion GDE12 the first catalyst layer-including substrate GDE1 was peeled.

The pair of upper/lower bonding rolls 18, 19 is provided so that each is rotatable around horizontal shafts, and so that the circumferences substantially contact each other at the downstream of the second substrate roll 17. This pair of upper/lower bonding rolls 18, 19 is configured to be heatable and, by causing the portion GDE 11 of a predetermined shape of the first catalyst layer-including substrate GDE1, polymer electrolyte membrane PEM and second catalyst layer-including substrate GDE2 laminated vertically to pass therethrough from upstream to downstream, applies a vertical external force and heat to this portion GDE 11 of a predetermined shape of the first catalyst layer-including substrate GDE1, polymer electrolyte membrane PEM and second catalyst layer-including substrate GDE2 while rotating, and bonds this portion GDE 11 of a predetermined shape of the first catalyst layer-including substrate GDE1, polymer electrolyte membrane PEM and second catalyst layer-including substrate GDE2. In other words, the pair of upper/lower bonding rolls 18, 19 forms the second catalyst layer 121 on the lower face which is the other face of the polymer electrolyte membrane PEM.

The cutter 20 is provided downstream of the pair of upper/lower bonding rolls 18, 19 so as to be vertically moveable, above the portion GDE 11 of a predetermined shape of the first catalyst layer-including substrate GDE1, polymer electrolyte membrane PEM and second catalyst layer-including substrate GDE2, which are bonded together by passing through this pair of upper/lower bonding rolls 18, 19. This cutter 20 performs trimming such as cutting on the polymer electrolyte membrane PEM and second catalyst layer-containing substrate GDE2 by moving downwards. In other words, the cutter 20 punches out the polymer electrolyte membrane PEM and second catalyst layer-including substrate GDE2 on which the second catalyst layer 121 is formed, so that the first catalyst layer-including substrate GDE11 of a predetermined shape bonding to the top face which is one face of the polymer electrolyte membrane PEM is surrounded. A plurality of fuel cell membrane electrolyte assemblies MEAs is thereby completed.

Next, a method for producing a fuel cell membrane electrode assembly MEA of the present embodiment executed by the production line 1 will be explained while referencing FIG. 1.

The method for producing a fuel cell membrane electrode assembly MEA on the production line 1 includes a Step 1, Step 2, Step 3, Step 4, Step 5, Step 6, Step 7, etc.

In Step 1, the polymer electrolyte membrane PEM is prepared. More specifically, the polymer electrolyte membrane PEM is drawn out to downstream from the electrolyte membrane roll 10.

In Step 2, the first catalyst layer-including substrate GDE1 on which the first catalyst layer 111 is formed on the lower face, which is one face of a continuous sheet-like (belt-like) substrate, is prepared. More specifically, in Step 2, the first catalyst layer-including substrate GDE1 is drawn out to travel downstream from the first substrate roll 11.

In Step 3, the first catalyst layer-including substrate GDE1 that is drawn out to travel from the first substrate roll 11 is laminated so that the first catalyst layer 111 opposes the top face which is one face of the polymer electrolyte membrane PEM that is drawn out to travel from the electrolyte membrane roll 10.

In Step 4, the polymer electrolyte membrane PEM and the first catalyst layer-including substrate GDE1, which are laminated to each other and travel, are bonded by the pair of upper/lower temporary bonding rolls 12, 13.

In Step 5, the cut CL is made so that the first catalyst layer-including substrate GDE1 bonding with the polymer electrolyte membrane PEM becomes a predetermined shape, by irradiating the laser beam LB of the laser device 14.

In Step 6, the unwanted portion GDE 12 other than the portion GDE 11 of a predetermined shape of the first catalyst layer-including substrate GDE1 is peeled from the polymer electrolyte membrane PEM and recovered by the recovery roll 15.

In Step 7, using the second catalyst layer-including substrate GDE2 that is drawn to travel from the second substrate roll 17, the second catalyst layer 121 is formed on the lower face which is the other face of the polymer electrolyte membrane PEM by the pair of upper/lower bonding rolls 18, 19, and the polymer electrolyte membrane PEM and the second catalyst layer-including substrate GDE2 on which the second catalyst layer 121 is formed are punched out by the cutter 20 so that the first catalyst layer-including substrate GDE11 of a predetermined shape bonding on the top face which is the one face of the polymer electrolyte membrane PEM is surrounded. A plurality of fuel cell membrane electrolyte assemblies MEA is thereby completed.

Next, the structure of the fuel cell membrane electrode assembly MEA produced by the method for producing a fuel cell membrane electrode assembly MEA of the present embodiment executed by the production line 1 will be explained while referencing FIG. 3.

As shown in FIG. 3, the fuel cell membrane electrode assembly MEA has a structure made by sandwiching the polymer electrolyte membrane PEM between the first catalyst layer-including substrate GDE11 and the second catalyst layer-including substrate GDE2. The first catalyst layer-including substrate GDE11 is configured by a first diffusion layer 113, first intermediate layer 112, and first catalyst layer 111 being laminated in this order. The first diffusion layer 113 is configured by a porous media which is perforated in the thickness direction, and carbon paper containing carbon fiber and carbon binder is used, for example. The first intermediate layer 112 is configured to include an electron conducting material and a water-repellent resin, for example. The first catalyst layer 111 is configured to include catalyst particles made by loading a catalytic metal such as platinum on a catalyst support such as carbon black, and a polymer electrolyte such as an ion-conductive polymer binder. Similarly, the second catalyst layer-including substrate GDE2 is also configured by a second diffusion layer 123, second intermediate layer 122 and second catalyst layer 121 being laminated in this order. The second diffusion layer 123 is a configuration similar to the first diffusion layer 113, the second intermediate layer 122 is a configuration similar to the first intermediate layer 112, and the second catalyst layer 121 is a configuration similar to the first catalyst layer 111.

In addition, with the fuel cell membrane electrode assembly MEA, a step is formed at the periphery by the first catalyst layer-including substrate GDE11 being a rectangular shape with an area smaller than the second catalyst layer-including substrate GDE2 and polymer electrolyte membrane PEM. For this reason, one face (top face) of the polymer electrolyte membrane PEM has the peripheral edge exposed in a rectangular frame shape. The creepage distance of the first catalyst layer 111 and second catalyst layer 121 is assumed, and the insulation is ensured. The method for producing the fuel cell membrane electrode assembly MEA of the present embodiment executed by the production line 1 is appropriate in the production of MEAs having such a step.

According to the method for producing a fuel cell membrane electrode assembly MEA of the present embodiment explained above, the following such effects are exerted.

The method for producing a fuel cell membrane electrode assembly MEA of the present embodiment, i.e. method for producing a fuel cell membrane electrode assembly MEA on the production line 1, is configured to include: Step 1 of preparing a polymer electrolyte membrane PEM; Step 2 of preparing a first catalyst layer-including substrate GDE1 made by a first catalyst layer 111 being formed on one face of a sheet-like substrate; Step 3 of laminating the first catalyst layer-including substrate GDE1 so that the first catalyst layer 111 opposes one face of the polymer electrolyte membrane PEM; Step 4 of bonding the polymer electrolyte membrane PEM and first catalyst layer-including substrate GDE1; Step 5 of making a cut CL by way of the laser beam LB of the laser device 14 so that the first catalyst layer-including substrate GDE1 bonded with the polymer electrolyte membrane PEM becomes a predetermined shape; Step 6 of peeling an unwanted portion GDE12 of the first catalyst layer-including substrate GDE1 other than a portion GDE11 of predetermined shape from the polymer electrolyte membrane PEM; Step 7 of forming a second catalyst layer 121 on one other face of the polymer electrolyte membrane PEM, and punching out the polymer electrolyte membrane PEM and second catalyst layer 121 so that the first catalyst layer-including substrate GDE11 of predetermined shape bonded at one face is surrounded, in which the laser beam LB of the laser device 14 is established as light of a wavelength that penetrates the polymer electrolyte membrane PEM without penetrating the first catalyst layer-including substrate GDE1.

In summary, the present embodiment configures to as to first bond the first catalyst layer-including substrate GDE1 only on one face of the polymer electrolyte membrane PEM, followed by cutting the unwanted portion GDE12 using a laser beam LB penetrating the electrolyte membrane without penetrating the catalyst layer-including substrate, and removing by peeling, and subsequently forming the second catalyst layer 121 on the other face. In this way, since the second catalyst layer 121 is formed on the other face after cutting into a predetermined shape and removing, this second catalyst layer 121 will not be removed by the laser beam LB having penetrated the polymer electrolyte membrane PEM. Therefore, according to the present embodiment, it is possible to prevent the required catalyst layer from being removed while suppressing damage to the electrolyte membrane.

In addition, in the present embodiment, the laser beam LB is set to have a transmissivity relative to the polymer electrolyte membrane PEM of at least 80%. It is thereby possible to more reliably suppress damage to the polymer electrolyte membrane PEM by using a high permeability laser beam.

(Second Embodiment)

Figure 4:
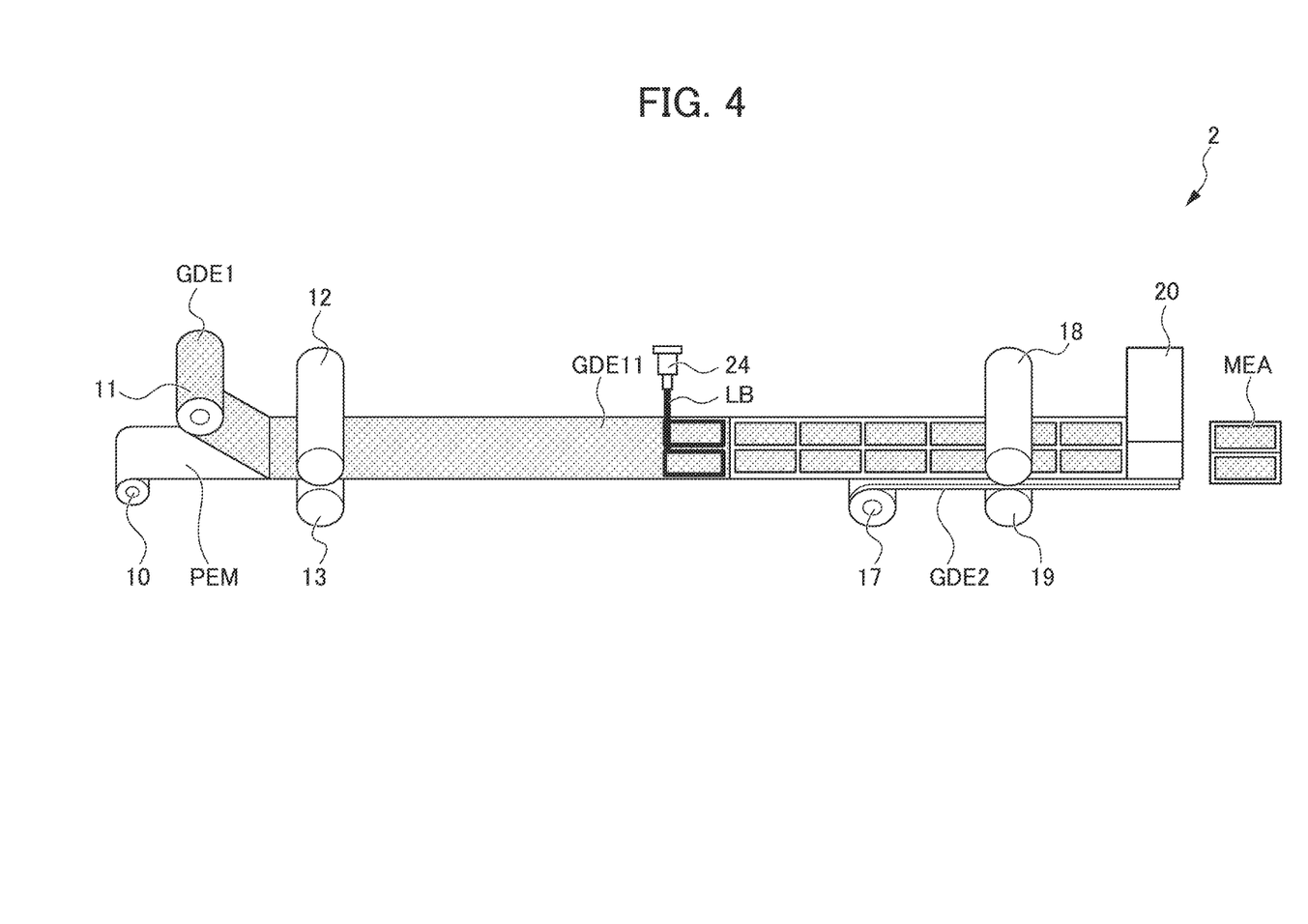
FIG. 4 is a schematic view showing a production line 2 for a fuel cell membrane electrode assembly MEA according to a second embodiment of the present invention.

FIG. 4 is a schematic view showing a production line 2 of a fuel cell membrane electrode assembly MEA according to a second embodiment of the present invention. It should be noted that the production line 2 according to the present embodiment is the same configuration as the production line 1 of the aforementioned first embodiment, except for the processing on the unwanted portion GDE12 of the first catalyst layer-including substrate GDE1 differing from the aforementioned production line 1.

The production line 2 of the fuel cell membrane electrode assembly MEA shown in FIG. 4 includes a first substrate roll 11, a pair of upper/lower temporary bonding rolls 12, 13, a laser device 24, a second substrate roll 17, a pair of upper/lower bonding rolls 18, 19, a cutter 20, etc. In other words, contrary from the aforementioned production line 1, the production line 2 and does not include a recovery roll 15, while including the laser device 24 in place of the laser device 14.

The laser device 24 is provided, similarly to the aforementioned laser device 14, downstream of the pair of upper/lower temporary bonding rolls 12, 13, above the first catalyst layer-including substrate GDE1 bonding on the top face of the polymer electrolyte membrane PEM passing through this pair of upper/lower temporary bonding rolls 12, 13, so as to be movable in the horizontal direction, and irradiates the laser beam LB towards this first catalyst layer-including substrate GDE1. This laser device 24, by irradiating the laser beam LB towards the first catalyst layer-including substrate GDE1 while moving in the horizontal direction, directly removes the unwanted portion GDE12 other than the predetermined shape portion GDE11, so as to make the first catalyst layer-including substrate GDE1 bonding with the polymer electrolyte membrane PEM into the predetermined shape (for example, rectangular). In other words, the unwanted portion GDE12 is directly removed by the laser device 24, by way of scanning and irradiating the laser beam LB over the entirety of the unwanted portion GDE12.

It should be noted that, as the laser beam LB of the laser device 24, a laser beam similar to the laser beam LB of the laser device 14 of the aforementioned first embodiment is used.

For the polymer electrolyte membrane PEM from which the unwanted portion GDE12 of the first catalyst layer-including substrate GDE1 was directly removed by the laser device 24, opposing a lower face which is one face thereof, is a second catalyst layer 121 (refer to FIG. 3), in which a top face that is one face of the second catalyst layer-including substrate GDE2 that is drawn to travel downstream from the second substrate roll 17 is formed on the top face of the second catalyst layer including substrate GDE2.

The second substrate roll 17 rotates about a horizontal shaft under the polymer electrolyte membrane PEM downstream of the laser device 24.

Next, the method for producing the fuel cell membrane electrode assembly MEA of the present embodiment executed by the production line 2 will be explained while referencing FIG. 4. It should be noted that the production method on the production line 2 according to the present embodiment is the same process as the production method on the aforementioned production line 1, except for the processing on the unwanted portion GDE12 of the first catalyst layer-including substrate GDE1 differing from the production method on the aforementioned production line 1.

The method for producing a fuel cell membrane electrode assembly MEA on the production line 2 includes Step 1, Step 2, Step 3, Step 4, Step 15, Step 7, etc. In other words, contrary to the production method on the aforementioned production line 1, the production line 2 includes Step 15 in place of Step 5, while not including Step 6.

In Step 15, the unwanted portion GDE12 is removed so that the first catalyst layer-including substrate GDE1 bonding with the polymer electrolyte membrane PEM becomes a predetermined shape, by irradiating the laser beam LB of the laser device 24.

According to the method for producing a fuel cell membrane electrode assembly MEA of the present embodiment explained above, the following such effects are exerted.

The method for producing a fuel cell membrane electrode assembly MEA of the present embodiment, i.e. method for producing a fuel cell membrane electrode assembly MEA on the production line 2, is configured to include: Step 1 of preparing a polymer electrolyte membrane PEM; Step 2 of preparing a first catalyst layer-including substrate GDE1 made by a first catalyst layer 111 being formed on one face of a sheet-like substrate; Step 3 of laminating the first catalyst layer-including substrate GDE1 so that the first catalyst layer 111 opposes one face of the polymer electrolyte membrane PEM; Step 4 of bonding the polymer electrolyte membrane PEM and first catalyst layer-including substrate GDE1; Step 15 of removing an unwanted portion GDE12 other than a portion GDE11 of predetermined shape by way of the laser beam LB of the laser device 24 so that the first catalyst layer-including substrate GDE1 bonded with the polymer electrolyte membrane PEM becomes a predetermined shape; and Step 7 of forming a second catalyst layer 121 on one other face of the polymer electrolyte membrane PEM, and punching out the polymer electrolyte membrane PEM and second catalyst layer 121 so that the first catalyst layer-including substrate GDE11 of predetermined shape bonded at one face is surrounded, in which the laser beam of the laser device 24 is established as light of a wavelength that penetrates the polymer electrolyte membrane PEM without penetrating the first catalyst layer-including substrate GDE1.

In summary, the present embodiment configures so as to use the laser beam LB penetrating the electrolyte membrane without penetrating the catalyst layer-including substrate to directly remove the unwanted portion GDE12, after bonding the first catalyst layer-including substrate GDE1 only to one face of the polymer electrolyte membrane PEM, and subsequently form the second catalyst layer 121 on the other face. Due to forming the second catalyst layer 121 on the other face after removing in a predetermined shape in this way, the second catalyst layer 121 will not be removed by the laser beam LB penetrating the polymer electrolyte membrane PEM. Therefore, according to the present embodiment, it is possible to prevent the required catalyst layer from being removed, while suppressing damage to the electrolyte membrane.

In addition, since the laser beam LB is set to have transmittance relative to the polymer electrolyte membrane PEM of at least 80% also in the present embodiment, it is possible to more reliably suppress damage to the polymer electrolyte membrane PEM by using a high transmittance laser beam.

The present invention is not to be limited to the above-mentioned embodiment, and modifications, improvements, etc. in a scope that can achieve the object of the present invention are also included in the present embodiment.

EXPLANATION OF REFERENCE NUMERALS

1, 2 production line
10 electrolyte membrane roll
11 first substrate roll
12, 13 temporary bonding roll
14, 24 laser device
15 recovery roll
17 second substrate roll
18, 19 bonding roll
20 cutter 111 first catalyst layer
121 second catalyst layer
MEA fuel cell membrane electrode assembly
LB laser beam (energy ray)
PEM polymer electrolyte membrane
GDE1 first catalyst layer-including substrate
GDE11 portion of predetermined shape of first catalyst layer-including substrate
GDE12 unwanted portion of first catalyst layer-including substrate
CL cut
GDE2 second catalyst layer-including substrate

What is claimed is:

1. A method for producing a fuel cell membrane electrode assembly comprising the steps of:
   preparing an electrolyte membrane;
   preparing a catalyst layer-including substrate in which a first catalyst layer is formed on one face of a sheet-like substrate;
   laminating the catalyst layer-including substrate so that the first catalyst layer opposes one face of the electrolyte membrane;
   bonding the electrolyte membrane and the catalyst layer including substrate;
   making a cut by way of energy rays so that the catalyst layer-including substrate bonded with the electrolyte membrane becomes a predetermined shape;
   peeling an unwanted portion of the catalyst layer-including substrate other than a portion of the predetermined shape from the electrolyte membrane;
   forming a second catalyst layer on one other face of the electrolyte membrane, and
   punching out the electrolyte membrane and the second catalyst layer so that the catalyst layer-including substrate of the predetermined shape bonded to the one face is surrounded,
   wherein the energy rays penetrate the electrolyte membrane without penetrating the catalyst layer-including substrate.

2. A method for producing a fuel cell membrane electrode assembly comprising the steps of:
   preparing an electrolyte membrane;
   preparing a catalyst layer-including substrate in which a first catalyst layer is formed on one face of a sheet-like substrate;
   laminating the catalyst layer-including substrate so that the first catalyst layer opposes one face of the electrolyte membrane;
   bonding the electrolyte membrane and the catalyst layer-including substrate;
   removing, so that the catalyst layer-including substrate bonded with the electrolyte membrane becomes a predetermined shape, an unwanted portion other than a portion of the predetermined shape by way of energy rays;
   forming a second catalyst layer on one other face of the electrolyte membrane, and
   punching out the electrolyte membrane and the second catalyst layer so that the catalyst layer-including substrate of the predetermined shape bonded to the one face is surrounded,
   wherein the energy rays penetrate the electrolyte membrane without penetrating the catalyst layer-including substrate.

3. The method for producing a fuel cell membrane electrode assembly according to claim 1, wherein the energy rays have a transmittance relative to the electrolyte membrane of at least 80%.

4. The method for producing a fuel cell membrane electrode assembly according to claim 2, wherein the energy rays have a transmittance relative to the electrolyte membrane of at least 80%.

* * * * *